United States Patent [19]

Beck et al.

[11] Patent Number: 4,483,217

[45] Date of Patent: Nov. 20, 1984

[54] MEANS FOR POSITIONING A SAW BLADE IN A MACHINE FOR WORKING ON SAWS

[75] Inventors: Ernst Beck, Maselheim; Peter Lenard, Biberach an der Riss; Erich Pokorny, Schemmerhofen, all of Fed. Rep. of Germany

[73] Assignee: Vollmer Werke Maschinenfabrik GmbH, Biberach an der Riss, Fed. Rep. of Germany

[21] Appl. No.: 520,729

[22] Filed: Aug. 5, 1983

[30] Foreign Application Priority Data

Aug. 13, 1982 [DE] Fed. Rep. of Germany ....... 3230189

[51] Int. Cl.³ ............................................. B23D 63/12
[52] U.S. Cl. ........................................... 76/75; 76/43
[58] Field of Search ............................... 76/37, 43, 75

[56] References Cited

U.S. PATENT DOCUMENTS 3,960,037  6/1976  Stier ........................................ 76/43

FOREIGN PATENT DOCUMENTS 2412938  10/1975  Fed. Rep. of Germany .

Primary Examiner—Roscoe V. Parker
Attorney, Agent, or Firm—Burns, Doane, Swecker & Mathis

[57] ABSTRACT

A saw blade (10) is supported on a saw blade carriage (14) adapted to be adjusted by an adjusting drive means (18) along a carriage guide means (16) and cooperating with a distance measuring means (26,28,30). A sensor means (34) is disposed in the path of movement of the saw blade (10) and emits signals in response to the position of a front edge portion of the saw blade (10) extending transversely of the carriage guide means (16). The adjusting drive means (18) is controlled by these signals and stopped at a predetermined nominal position of the front edge portion of the saw blade (10). In this manner the saw blade (10) positioning is effected automatically and the positioning accomplished permits a conclusion to be drawn with respect to the diameter of the saw blade (10) so that no separate measurement thereof is required.

15 Claims, 4 Drawing Figures

MEANS FOR POSITIONING A SAW BLADE IN A MACHINE FOR WORKING ON SAWS

The invention relates to a means for positioning a saw blade in a machine for working on saws, comprising a saw blade carriage for supporting the saw blade and an adjusting drive means for adjustment of the saw blade carriage along a carriage guide means.

In known means of this kind (DE-OS 24 12 938) the adjustment drive, for example an electric motor connected with the saw blade carriage by a threaded spindle is controlled by hand, such as by pressing keys so that the saw blade supported on the saw blade carriage moves into a preliminary working position in which trial working is carried out, such as grinding the back of one tooth of the saw blade. If this trial working is not satisfactory, either the saw blade carriage or a processing unit, such as a grinding unit of the machine for working on saws is readjusted and aother trial is made. This process is repeated until the trial working shows that a machining allowance has been adjusted which is just adequate. This kind of manual positioning, or at least manually controlled positioning, which requires the full attention of the operator in known means of the kind specified initially at best may be dispensed with upon positioning of one saw blade if the subsequent working is to be made on saw blades of exactly the same diameter, provided the data obtained during the positioning of the first saw blade are memorized and then utilized for control of the means in positioning successive saw blades.

In general, however, saw blades, particularly those of greater nominal diameter, even when novel deviate more or less considerably from the nominal diameter. Such deviations may be due to the fact that for price reasons usually a punching tool operating in a single stroke to cut larger saw blades out of a saw blade body was not available but instead a circular cutting device was used which operates much less accurately. Even greater differences in diameter than those caused by the original manufacture result from use of saw blades which originally had the same nominal diameters and then were resharpened at different frequencies and with different machining allowances, for instance because teeth had been broken out.

Regardless of the degree of deviation of the actual saw blade diameter from the nominal diameter in any particular case, often it is necessary to determine the existing saw blade diameter to be able to draw conclusions as to the nominal diameter on the basis of which the saw blade then may be allocated to a certain model series in which certain other features, like a certain pitch, sequence of part cutting and finishing teeth having differently chamfered edges and the like are associated with the nominal diameter. For this reason the operators of machines for working on saws frequently had to measure the diameter of a saw blade by hand, for instance using a big sliding caliper which is correspondingly difficult to handle.

It is therefore an object of the invention to develop a means of the kind specified initially such that the difficulties mentioned above in positioning a saw blade are eliminated or at least reduced substantially and the positioning accomplished permits a conclusion to be drawn as to the diameter of the saw blade.

The object is met, in accordance with the invention, in that a distance measuring means is associated with the saw blade carriage, a sensor means is disposed in the path of movement of the saw blade supported on the saw blade carriage to emit signals in response to the position of a front edge portion of the saw blade extending transversely of the carriage guide means, and the adjusting drive means is controlled by those signals and stopped at a predetermined rated position of the front edge portion of the saw blade.

The location of the saw blade center with respect to the saw blade carriage is known since the latter comprises a mandrel or the like which is finished and arranged with the greatest accuracy and serves to hold the saw blade. From the distance measuring means also the location of the saw blade carriage and thus of the saw blade center is known with respect to a zero point to be selected at random. Also the rated position into which the front edge portion of the saw blade is to be moved is at a known distance from zero. The saw blade diameter equals twice the difference of these two distances and thus is derived simply by reading the distance of the saw blade center from zero on the distance measuring means when the front edge portion of the saw blade has reached the rated position.

Preferably the sensor means as well as a nominal value transmitter are connected to a comparator, and a clock generator which interrogates the comparator clockwise applies corresponding pulses to a stepping motor belonging to the adjusting drive means. The location of the saw blade carriage can be determined continuously by adding and subtracting the positive and negative pulses received from the stepping motor.

This can be accomplished in simple manner by connecting the comparator and a zero initiator or setback means which is connected to the adjusting drive means with a position counter which in turn is connected to a display device.

The sensor means is adapted to determine by known optical, electromagnetic, inductive, or capacitive means whether the front edge portion of the saw blade, embodied for instance by an individual tooth tip, has reached its rated position.

An embodiment of the means according to the invention with which the sensor means comprises a mechanical sensor mounted on a sensor slide which is reciprocable transversely of the plane of the saw blade between a sensing position and a retracted position has proved to be sufficiently accurate and not at all susceptible to trouble.

This means preferably is so designed that the sensor is supported on the sensor slide for pivoting motion about an axis perpendicular to the plane of the saw blade and extends in the plane of the saw blade at right angles with respect to the carriage guide means when the front edge portion of the saw blade is in its nominal position.

Finally, it is advantageous above all for reasons of space if the rated position of the front edge portion of the saw blade is located at a predetermined distance from a working position into which the saw blade is adjustable when the sensor slide is in its retracted position.

The invention will be described further, by way of example, with reference to the accompanying drawings, in which.

Figure 1:
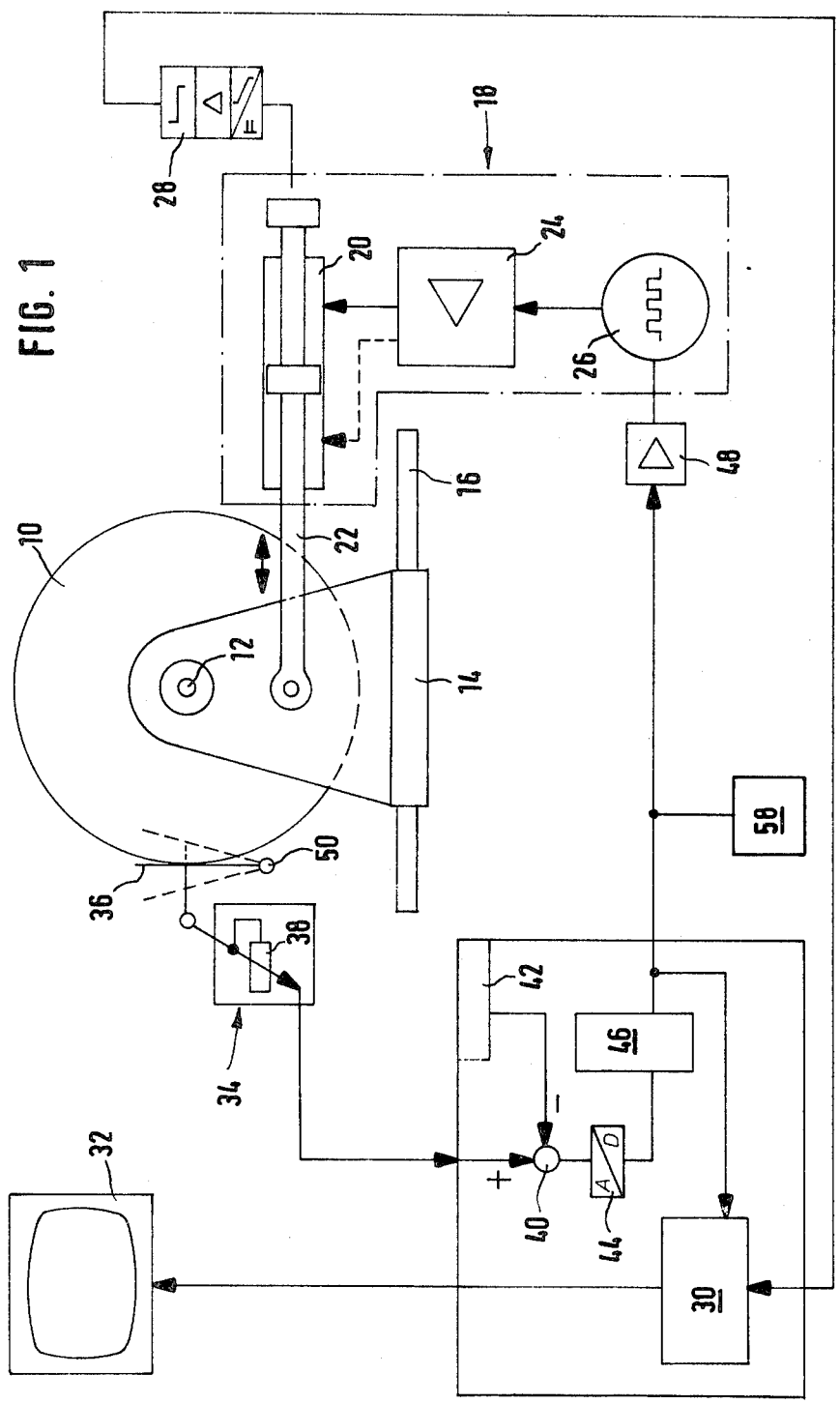
FIG. 1 is simplified side elevational view of a means according to the invention in connection with a circuit diagram.

The means shown is arranged on a machine for working on saws, for instance a saw grinding machine and its object is to position a saw blade 10 and measure the diameter thereof. The saw blade 10 is supported for rotation on a mandrel 12 engaging in a central hole in the saw blade and secured to a saw blade carriage 14. The saw blade carriage 14 is displaceable along a carriage guide means 16 and, for this purpose, connected to an adjusting drive means 18.

In the embodiment shown the adjusting drive means 18 is embodied by an electro-hydraulic linear amplifier and comprises a stationary hydraulic cylinder 20 the piston rod 22 of which is connected to the saw blade carriage 14. The cylinder 20 is designed to be double acting and is fed by an hydraulic regulator 24 the adjustment of which is variable by a stepping motor 26.

The piston rod 22 cooperates with a zero initiator 28 which is connected to a position counter 30. The stepping motor 26, zero initiator 28, and position counter 30 together form a distance measuring means which permits the determination of the location of the saw blade carriage 14 and thus of the saw blade 10 at any time with respect to a zero point which may be selected at random. This information may be read, for instance, on a display device 32 in the form of a video screen connected to the position counter 30.

A sensor means 34 comprising a sensor 36 and a potentiometer connected to the same is disposed in the path of movement of the saw blade 10. The potentiometer 38 supplies direct voltage in response to the position of the sensor 36, and this direct voltage is compared by a comparator 40 with a reference voltage supplied by a nominal value transmitter 42. The comparator 40 is connected by an A/D converter 44 to a clock generator 46 which, on the one hand, is connected to the position counter 30 and, on the other hand, by a power amplifier 48 to the stepping motor 26.

The sensor 36 is supported on a sensor slide 52 for pivoting about an axis 50 which extends at right angles to the plane of the saw blade 10 and thus at right angles to the longitudinal direction of the carriage guide means 16. When the saw blade 10 is in a rated position, as shown by a full circle each in FIGS. 1 and 2, the saw blade 10 holds the sensor 36 in a position indicated by a continuous line in FIG. 1. In this position the sensor 36 extends in the plane of the saw blade 10 perpendicularly to the longitudinal direction of the carriage guide means 16.

The sensor 36 is biassed, for instance by a spring, such that it tends to adopt a rest position, indicated in FIG. 1 by a discontinuous line, before a tooth of the saw blade 10 which is being advanced from the right toward the sensor means 34, hits the sensor 36. As the saw blade 10 advances beyond the rated position, the sensor 36 may be pivoted into a terminal position, as indicated by a dash-dot line in FIG. 1, the latter position lying beyond the nominal position, as seen from the position of rest.

The potentiometer 38, for example a commercially available rotary potentiometer is so designed and arranged that the direct voltage it supplies as the sensor 36 is deflected from its position of rest into the terminal position varies linearly. The clock frequency of the clock generator 46 is adjustable. Changing the clock frequency thus changes the speed of rotation of the stepping motor 26 and accordingly the speed of movement of the saw blade carriage 14.

Figure 3:
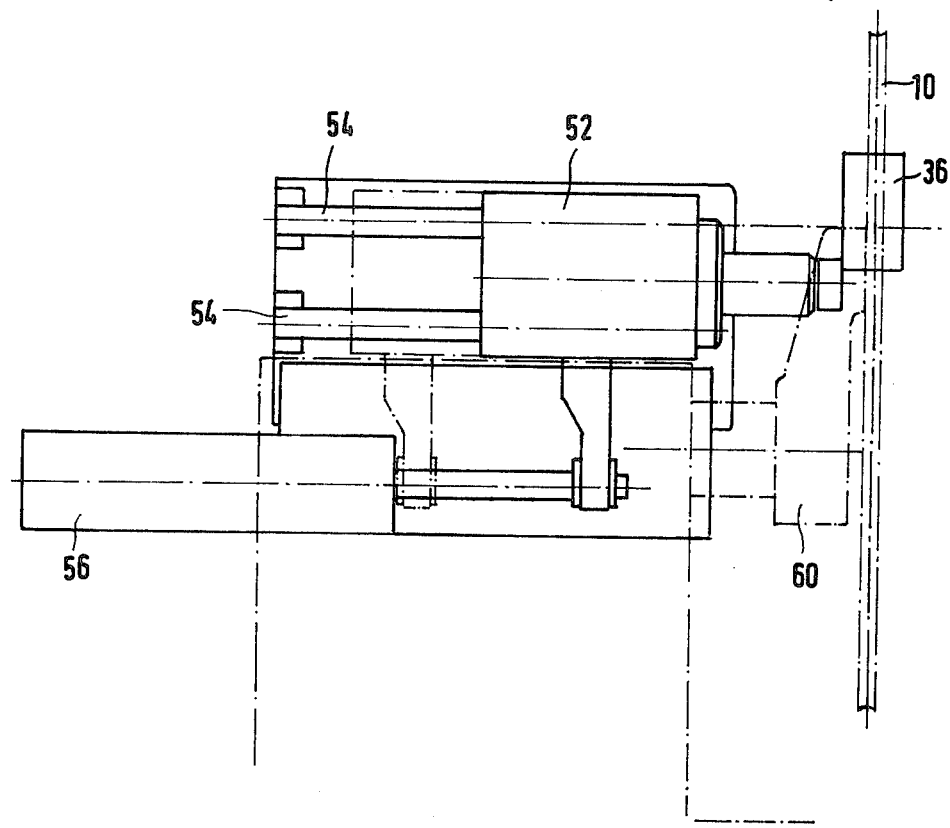
FIG. 3 is an elevation as seen in the direction of arrow III in FIG. 2.
Figure 4:
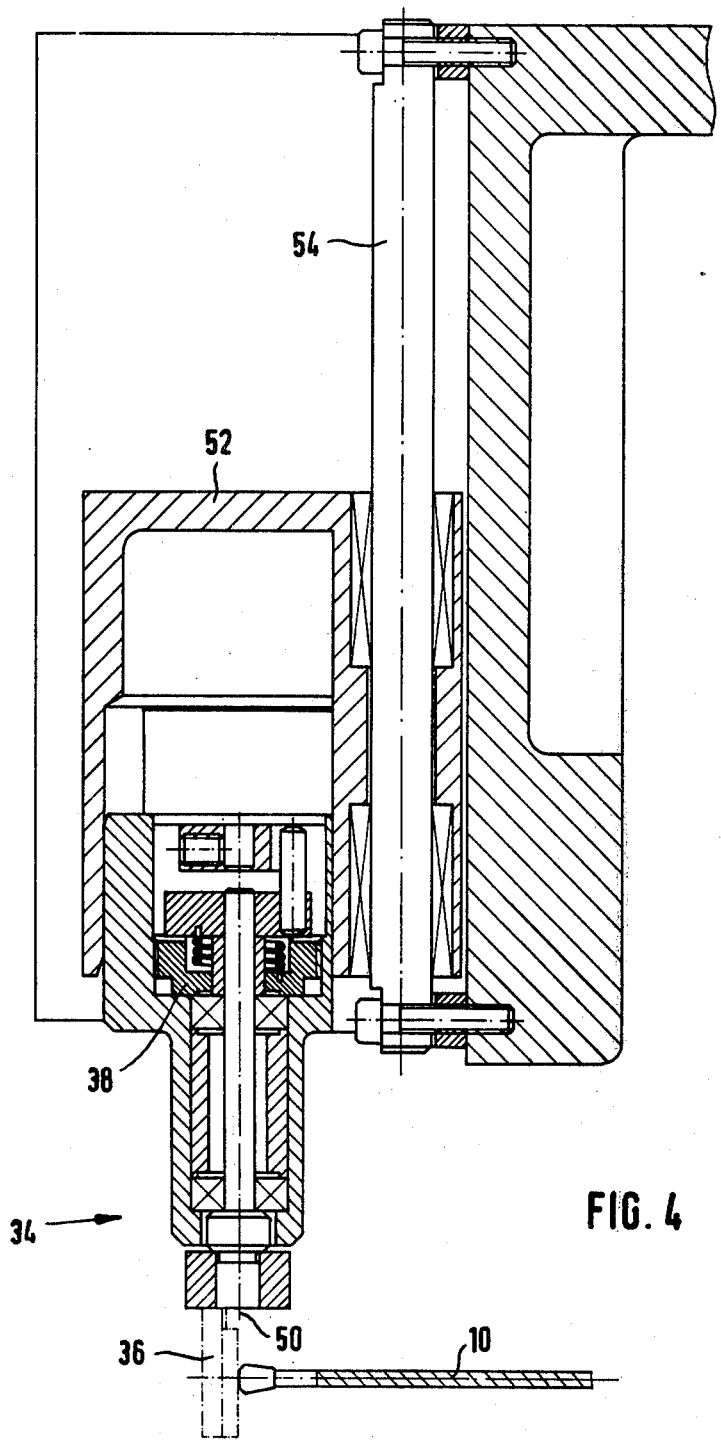
FIG. 4 is a sectional view along line IV—IV in FIG. 2.

The sensor slide 52 is reciprocable on a pair of guides 54 arranged in parallel with the axis 50, between the sensing position indicated in continuous lines in FIG. 3 and a retracted position indicated in dash-dot lines. To this end it is connected to an hydraulic cylinder 56.

Figure 2:
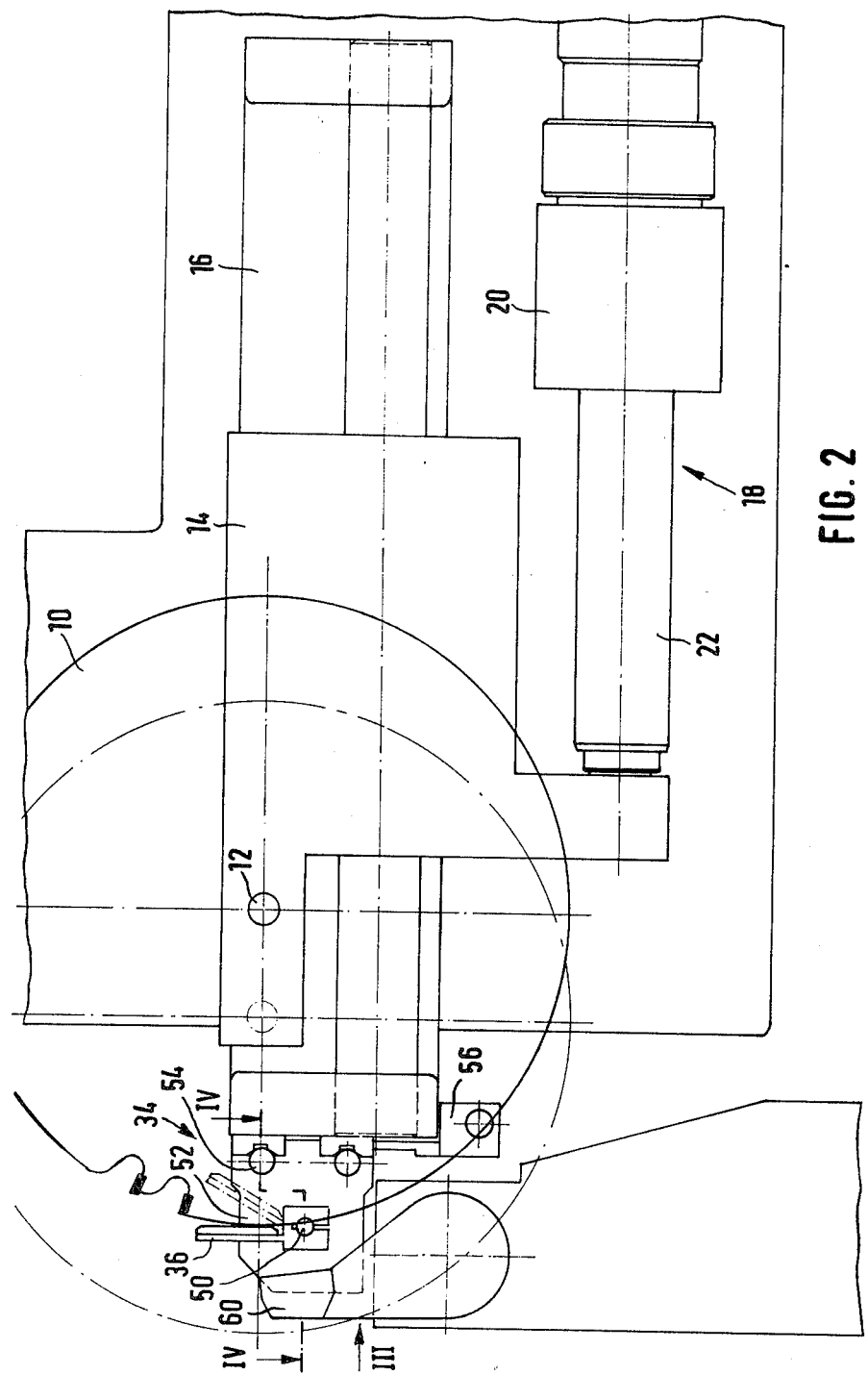
FIG. 2 is a cut-out of FIG. 1 on an enlarged scale and shown more accurately.

When the sensor slide 52 is in the retracted position, the sensor means 34 opens the way for further displacement of the saw blade 10 out of the nominal position into a working position, indicated in FIG. 2 by a discontinuous circle line. The distance between the rated position and the working position is fixed in a storage means 58 in the form of a pulse train which is applied to the stepping motor 26 upon measuring of the saw blade diameter.

In its working position the saw blade 10 may be clamped in the usual manner between a pair of clamping jaws 60. These clamping jaws for example are operable hydraulically and controlled by a program such that they only loosely clamp the saw blade 10 while it is being advanced stepwise by rotation of the saw blade by one tooth pitch, whereas they exert strong clamping pressure on the saw blade during the intervals in between so as to hold the saw blade firmly for grinding or any other working on the saw blade.

What is claimed is:

1. A means for positioning a saw blade in a machine for working on saws, comprising
a saw blade carriage (14) for supporting the saw blade (10),
and an adjusting drive means (18) for adjustment of the saw blade carriage (14) along a carriage guide means (16), characterized in that
a distance measuring means (26,28,30) is associated with the saw blade carriage (14),
a sensor means (34) is disposed in the path of movement of the saw blade (10) supported on the saw blade carriage (14) to emit signals in response to the position of a front edge portion of the saw blade (10) extending transversely of the carriage guide means (16),
and the adjusting drive means (18) is controlled by those signals and stopped at a predetermined rated position of the front edge portion of the saw blade (10).

2. The means as claimed in claim 1, characterized in that the sensor means (34) and a nominal value transmitter (42) are connected to a comparator (40) and a clock generator (46) for clockwise interrogation of the comparator (40) emitting corresponding pulses to a stepping motor (26) which belongs to the adjusting drive means (18).

3. The means as claimed in claim 2, characterized in that the comparator (40) and a zero initiator (28) connected to the adjusting drive means (18) are connected to a position counter (30) which in turn is connected to a display device (32).

4. The means as claimed in claim 1, characterized in that the sensor means (34) comprises a mechanical sensor (36) mounted on a sensor slide (52) which is adapted to be reciprocated between a sensing position and a retracted position transversely of the plane of the saw blade (10).

5. The means as claimed in claim 4, characterized in that the sensor (36) is supported on the sensor slide (52) for pivoting motion about an axis (50) extending at right angles to the plane of the saw blade (10) and itself extends in the plane of the saw blade (10) at right angles with respect to the carriage guide means (16) when the front edge portion of the saw blade (10) is in its rated position.

6. The means as claimed in claim 4, characterized in that the rated position of the front edge portion of the saw blade (10) is located at a predetermined distance from a working position into which the saw blade (10) is adjustable when the sensor slide (52) is in its retracted position.

7. The means as claimed in claim 2, characterized in that the sensor means (34) comprises a mechanical sensor (36) mounted on a sensor slide (52) which is adapted to be reciprocated between a sensing position and a retracted position transversely of the plane of the saw blade (10).

8. The means as claimed in claim 3, characterized in that the sensor means (34) comprises a mechanical sensor (36) mounted on a sensor slide (52) which is adapted to be reciprocated between a sensing position and a retracted position transversely of the plane of the saw blade (10).

9. The means as claimed in claim 5, characterized in that the rated position of the front edge portion of the saw blade (10) is located at a predetermined distance from a working position into which the saw blade (10) is adjustable when the sensor slide (52) is in its retracted position.

10. The means as claimed in claim 7, characterized in that the sensor (36) is supported on the sensor slide (52) for pivoting motion about an axis (50) extending at right angles to the plane of the saw blade (10) and itself extends in the plane of the saw blade (10) at right angles with respect to the carriage guide means (16) when the front edge portion of the saw blade (10) is in its rated position.

11. The means as claimed in claim 8, characterized in that the sensor (36) is supported on the sensor slide (52) for pivoting motion about an axis (50) extending at right angles to the plane of the saw blade (10) and itself extends in the plane of the saw blade (10) at right angles with respect to the carriage guide means (16) when the front edge portion of the saw blade (10) is in its rated position.

12. The means as claimed in claim 7, characterized in that the rated position of the front edge portion of the saw blade (10) is located at a predetermined distance from a working position into which the saw blade (10) is adjustable when the sensor slide (52) is in its retracted position.

13. The means as claimed in claim 8, characterized in that the rated position of the front edge portion of the saw blade (10) is located at a predetermined distance from a working position into which the saw blade (10) is adjustable when the sensor slide (52) is in its retracted position.

14. The means as claimed in claim 10, characterized in that the rated position of the front edge portion of the saw blade (10) is located at a predetermined distance from a working position into which the saw blade (10) is adjustable when the sensor slide (52) is in its retracted position.

15. The means as claimed in claim 11, characterized in that the rated position of the front edge portion of the saw blade (10) is located at a predetermined distance from a working position into which the saw blade (10) is adjustable when the sensor slide (52) is in its retracted position.

* * * * *